United States Patent
Lee

(10) Patent No.: US 7,185,713 B2
(45) Date of Patent: Mar. 6, 2007

(54) AIR-DRIVEN SCREWDRIVER PERFORMS HOLE DRILLING, THREAD TAPPING AND BOLT TIGHTENING

(75) Inventor: Tsuh Chang Lee, Lw Jou (TW)

(73) Assignee: Mi Jy-Land Industrial Co., Ltd., Taipei Shian (TW)

( * ) Notice: Subject to any disclaimer, the term of this patent is extended or adjusted under 35 U.S.C. 154(b) by 0 days.

(21) Appl. No.: 11/068,957

(22) Filed: Mar. 2, 2005

(65) Prior Publication Data

US 2006/0196684 A1    Sep. 7, 2006

(51) Int. Cl.
B25B 21/00    (2006.01)

(52) U.S. Cl. ............... 173/93.5; 173/93; 173/176; 173/216

(58) Field of Classification Search ............ 173/93, 173/93.5, 93.6, 216, 176, 11, 4, 217; 81/57.44, 81/434
See application file for complete search history.

(56) References Cited

U.S. PATENT DOCUMENTS

| | | | | |
|---|---|---|---|---|
| 3,578,091 | A * | 5/1971 | States ..................... | 173/176 |
| 5,730,035 | A * | 3/1998 | Ohmori et al. ............ | 81/57.44 |
| 6,155,139 | A * | 12/2000 | Tanji ........................ | 81/57.44 |
| 6,223,834 | B1 * | 5/2001 | Takamura et al. ......... | 173/93.5 |
| 6,505,690 | B2 * | 1/2003 | Tokunaga .................. | 173/93.5 |
| 6,672,404 | B2 * | 1/2004 | Kamo et al. ............... | 173/11 |
| 6,708,778 | B2 * | 3/2004 | Tokunaga .................. | 173/93.5 |
| 6,782,957 | B2 * | 8/2004 | Fujiyama ................... | 173/93.5 |
| 6,880,431 | B2 * | 4/2005 | Wakabayashi et al. .... | 81/57.44 |
| 6,942,042 | B2 * | 9/2005 | Lee ............................ | 173/11 |

* cited by examiner

Primary Examiner—Scott A. Smith
(74) Attorney, Agent, or Firm—Troxell Law Office, PLLC

(57) ABSTRACT

A novel air-driven screwdriver is integrally designed to perform three functions, hole drilling, thread tapping and bolt tightening with special characteristic in which a passive inner gear assembly is employed as a driver to replace the clutch as used by the prior art. When the torque reaches at a specified level, the cam in the inner gear assembly will jump up and down, working similarly as the clutch, coupling with the torque spring and torque adjusting mechanism to control the output of the actual torque applied. This design eliminates the attachment of the clutch, shortens the overall length of tool, reduces the total weight and becomes more practical and reliable tool machine.

3 Claims, 3 Drawing Sheets

AIR-DRIVEN SCREWDRIVER PERFORMS HOLE DRILLING, THREAD TAPPING AND BOLT TIGHTENING

BACKGROUND OF THE INVENTION

1. Field of the Invention

This invention relates to a multi-function air driven screwdriver, especially designed to perform the hole drilling, thread tapping and bolt tightening. It eliminates the attachment of the clutch, makes the tool shorter and lighter, and becomes a practical machine tool.

2. Description of the Prior Art

On most prior art of semi-auto air-driven screwdrivers, pressing action is utilized (pressing down or releasing) to the control the start or stop of inner motor section and the drive comes from the active gear assembly but not moveable. The gear disk will move the upper clutch and the lower clutch and the torque magnitude are controlled by the clamping action of the torque spring. When the torque reaches at a specified level, the motor section and the gear, assembly begins to rotate, however, the lower clutch and the screwdriver tip remain motionless. When the pressing is released, the motor section and the gear assembly stop. This is the action to complete bolt tightening. In this design, the motor section is a must the driving mechanism is conceivably complicated.

In this bolt tightening process, from the start of the motor section to the stop of operation, in which, the preset torque, the motor inertia, the control over the frequency of motor repeated jumping and the torque applied to tighten the bolt are critical to the precision and quality of bolt tightening. However, the manual control and operation of the air-driven screwdriver can never be maintained at a specified standard, so the high quality of tightening bolt is too hard to keep.

In the prior art of the air-driven screwdriver, the torque spring which is used to preset the torque, is mounted between the screwdriver tip and the motor section and passing the sleeve and the connecting rod and the motor inertia is employed to control the jumping frequency of the motor so as to stop the motor running. In case it is necessary to change the preset torque, it has to disassemble the whole screwdriver in order to change the torque spring, a time-consuming operation. If the change frequency of required torque is high, it is an extreme bothering to the operator. In adjusting the preset torque, variation occurs frequent in clutch jumping frequency and motor stop timing which leads to varying preset torque. For this point, the prior art of the air-driven screwdriver will never succeed.

SUMMARY OF THE INVENTION

The main object of this invention is to provide a novel air-driven screwdriver performing three functions, hole drilling, thread tapping and bolt tightening in the drive is carried out a passive inner gear assembly in the place of the clutch as used in the prior art. When the torque reaches at the specified level, the catching ball in coupling with the inner gear assembly will jump along the cam seat functioned entirely similar to the clutch, in collaboration with the torque spring and. the torque adjusting ring to gain the control over the required torque as well as the screwdriver performance. This design eliminates the attachment of the clutch, shorten the overall length and reduce the total weight of the machine tool, a new novel practical tool.

This invention is explained in great detail with the aid of the embodiments as illustrated in the drawings attached.

Practice

DETAILED DESCRIPTION OF THE PREFERRED EMBODIMENT

Figure 1:
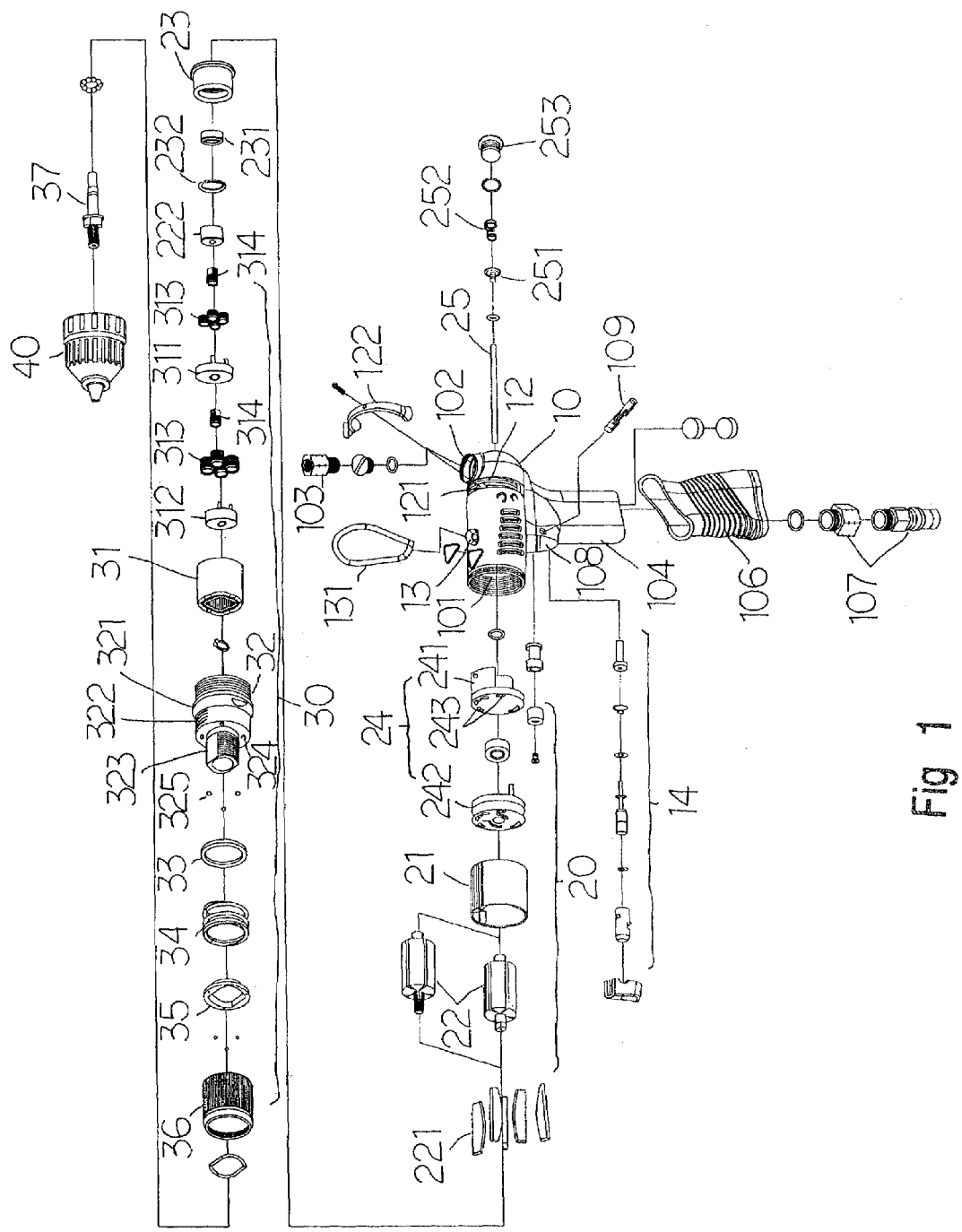
FIG. 1 shows the disassembly of the air-driven screwdriver of this invention.
Figure 2:
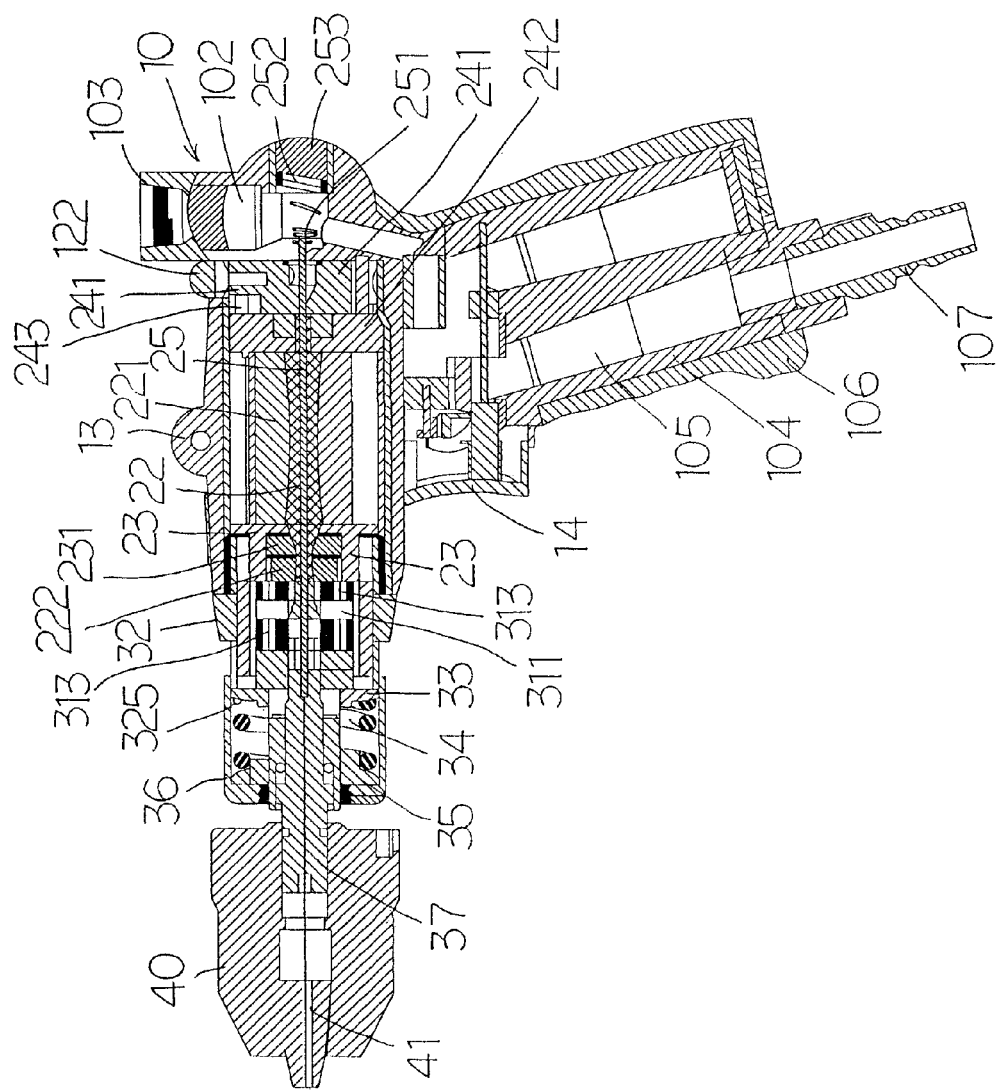
FIG. 2 shows the assembly of the air-driven screwdriver of this invention.
Figure 3:
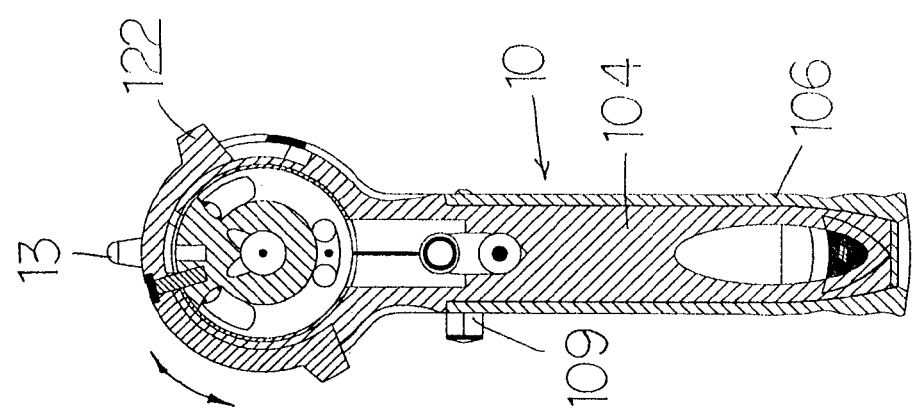
FIG. 3 shows the cross section displaying the air supply flows in and out.

Please refer to FIGS. 1 through 3; the air-driven screwdriver as provided in this invention mainly comprises a rigid body (10) in pistol grip pattern. The body (10) has a chamber (101) and an opening (102) along with the connecting bolt to be linked to the air supply (11) (not shown). A curved recess groove (120 with curved hole (121) to receive the selection switch (122) which is to control the clockwise rotation or reverse rotation of the rotor (22) of the motor section (20). A hanging eye (13) with a hanging ring (131) is use to hang the screwdriver over head, easy for the operator to apply. At the lower end of the body (10), there is a handle (106) with hollow groove (105) linked with the opening (101) and connecting bolt (107) to accept the air supply (11) (not shown). The retainer (104) provides an open hole (108) to receive the trigger (14). The displacement of the trigger (14) will control the air valve (105) permitting the entry of air supply (11) or not. The stop pin (109) will pass the open hole (108) so as to keep the hollow groove (105) in the open position, maintaining the screwdriver ready for the operation.

The chamber (101) of the body (10) houses in order a motor section (20), an inner gear assembly (30) and chuck (40). The motor section (20) consists of a case (21) to receive the rotor (22). The rotor (22) is encircled with several radiant blades (221). At the front end of rotor (22), there extends a securing sleeve (23), a bearing (231), a "C" ring (232) and a drive (222) with a square hole linked to the rotor (22). At the rear end of the rotor (22), there exist the air valve turn table (24) composed of the upper turn table and lower turn table (241, 242), punch (25), cap (251) spring (252) and outer cap (253). The upper turn table (241) has several curved air guide chute (243) linked to the selection switch (122) of the body (10). When the selection switch (122) is turned, it will displace the upper turn table (241) and change the air direction in the air guide chute (243) and the air supply will make the rotor (22) running in the reverse direction.

The inner gear assembly (30) comprises inner threaded torque cylinder (31) containing two pairs of star gear (313) and round gear disks (311, 312). The round gear disks (311, 312) are linked to the drive (222) by the drive gear (314) for power transfer and acceleration. In the front end of the torque cylinder (31), there is a cam seat (32) containing three set in layers, the first layer (321), the second layer (322) and the third layer (323). On the second layer (322), there spread a several recess (324) to accept catching ball (325), which is held in place by seal ring (33), torque spring (34) and torque adjusting ring (35) and finally a bolt sleeve (36) will be locked to the third layer (323) by the threads. A connecting shaft (37) will pass the cam seat (32) and link to the chuck (40) to form a complete power transfer chain.

The chuck (40) has a hollow passage (41) to receive the connecting shaft (37) at the rear end and the tips, drill tips and tapers in various sizes for easy installation at the other end.

This air-driven screwdriver is designed for the operator to connect the air supply (11) to the upper connecting bolt (103) or the lower connecting bolt (107) as the situation warrants. The operator has further convenience to select the proper tip to be inserted into the chuck (40) for his job. When the trigger (14) is locked by the stop pin (109), the screwdriver is always maintained in readiness. The movement of the connecting shaft (37) will push the punch (25), cap (251) upward, the compressed air (11) flows into the motor section (20) to drive the blade (221) and the rotor (22) to rotate. When all associate parts are running, the tip inserted in the chuck will begin to work. Taking the tightening bolt as an example, when the operator presses the screwdriver, the ball (325) will collaborate with jump of the cam seat (32) in the inner gear assembly (30) to carry out the bolt tightening job. The press is released, the connecting shaft (37) and the punch (25) will return, the air supply is stopped to enter the motor section (20), the screwdriver remains no action.

By pressing or releasing, the screwdriver is therefore activated to carry out the hole drilling, bolt tightening and thread tapping, easy and comfortable operation.

The screwdriver of this invention is easy to achieve the following jobs:

1. Bolt Tightening

It works without the clutch, instead a set of inner gear assembly in which the turn table of the inner gear assembly acts as the upper clutch and the torque cylinder as the lower clutch.

2. Hole Drilling

The operator has the option to insert the drill tip, screwdriver tip and tapping tip into the chuck to perform the multifunction job as he desires.

3. Thread Tapping

Pressing the chuck to start the tapping. Upon completion of the threading job, the motor is at race, release the chuck or shift the selection switch to reverse position to withdraw the screwdriver.

4. Extra Functions

The air supply can be hooked to the screwdriver through the upper opening or the lower opening dependent on which way is best suited to the production line layout.

The air-driven screwdriver provided in this invention can carry three functions, namely, hole drilling, bolt tightening and thread tapping which solve many troubles the prior art of air-driven screwdriver has ever faced. It is novel and progressive invention, justified for the grand of a patent.

What is claimed:

1. An air-driven screwdriver for hole drilling, bolt tightening and thread tapping comprising:
   a pistol type body;
   a motor assembly;
   an inner gear assembly;
   a chuck; and
   a chamber which houses the motor section, the inner gear assembly and the chuck,
   wherein the motor section comprises a case for receiving a rotor, the rotor being encircled with a plurality of radiant blades, the motor section comprising at a front end, a securing sleeve, a bearing c ring and a square drive linked with the rotor, the motor section comprising, at the rear end, upper and lower turn tables including an air valve, a punch, a cap, a spring and an outer cap,
   wherein the chuck comprises a central passage with one end to link to a connecting shaft and the other end to receive a tool tip,
   wherein the inner gear assembly contains an inner threaded torque cylinder including two pairs of round gear disk and a start gear linked with a drive gear, at the front end of the torque cylinder a cam seat being located and formed in three set-in layers, a first layer, a second layer and a third layer, wherein on the second layer, several recesses are located to receive catching balls sealed by a ring, a torque spring and a torque adjusting ring to set up the torque required, wherein the cam seat has the connecting shaft linked to the chuck to complete the power chain.

2. The air-driven screwdriver as claimed in the claim 1, further comprising:
   a hollow groove provided at a lower end of the handle which links to an upper opening hole with a bolt connection to hook up the air supply through the lower end of the handle; and
   a hole installed to accept a trigger, the trigger being configured to allow the air supply flowing into or to stop the air flow through the selective release or engagement of the trigger, the trigger being outfitted with a stop pin to hold a displacement of the trigger at a specified position to keep the screwdriver always in readiness for operation.

3. The air-driven screwdriver as claimed in the claim 1, wherein the upper turn table of the valve turn table has a plurality of curved air guide chutes linked with a selection switch, the upper turn table and the selection switch being configured so that as soon as the selection switch is turned, the plurality of air guide chutes will change position to be against the rotor so as to cause the rotor to run in a reverse direction.

* * * * *